Sept. 21, 1943. O. H. CLARK 2,329,882
ILLUMINATED VEHICLE ORNAMENT
Filed Nov. 21, 1941
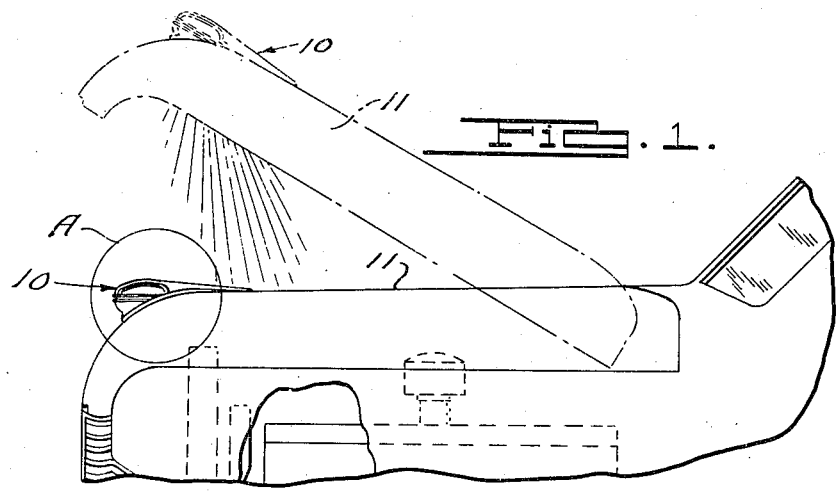
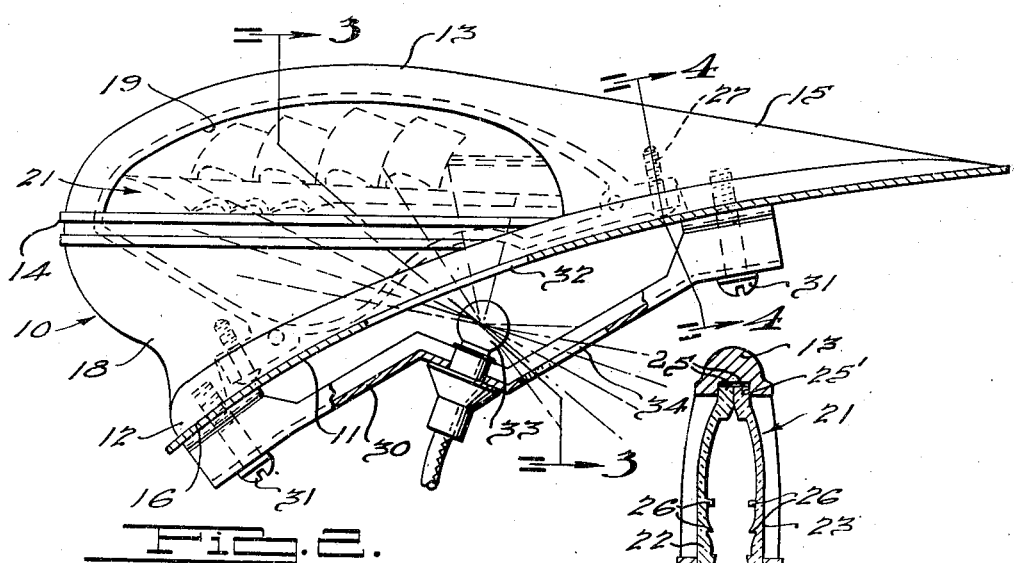
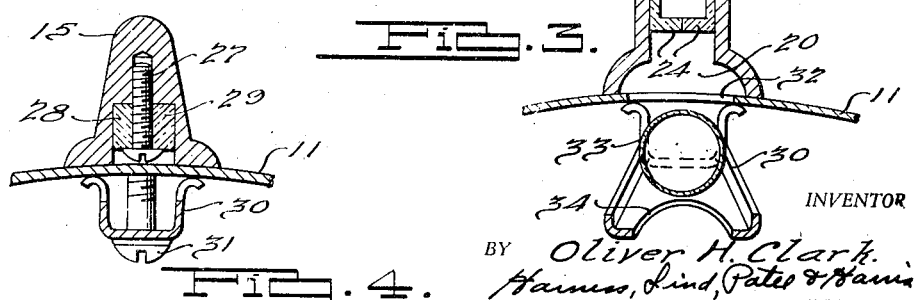
INVENTOR
BY Oliver H. Clark.
ATTORNEYS.

Patented Sept. 21, 1943

2,329,882

UNITED STATES PATENT OFFICE 2,329,882

ILLUMINATED VEHICLE ORNAMENT

Oliver H. Clark, Detroit, Mich., assignor to Chrysler Corporation, Highland Park, Mich., a corporation of Delaware Application November 21, 1941, Serial No. 419,882

2 Claims. (Cl. 240—7.1)

This invention relates to an improved vehicle ornament and illuminating means therefor.

More particularly, the invention relates to an illuminated vehicle hood ornament and illuminating means for the latter which is adapted to also illuminate the engine compartment of the vehicle when the hood is in raised position.

One of the main objects of the invention is the provision of a light emitting vehicle hood ornament which has a configuration bearing portion comprising plastic material of the type that is adapted to transmit light edgewise from a concealed source.

Another object of the invention is the provision of a source of light for an ornament of this kind which is so located as to direct light rays upon the plastic element of the ornament and into the engine compartment when the hood on which the ornament is provided is in raised position.

A further object of the invention is the provision of a light transmitting ornament of this kind which has a relatively smooth and continuous exterior and a hollow interior from the wall portions of which project inwardly light emitting ridge-like extensions for producing a desired illuminated configuration.

Additional objects of the invention are to provide an ornament of this kind which has a metal base and frame structure for supporting the plastic light transmitting element and to provide convenable, plastic light transmitting element sections which have joined extremities confined within and concealed by the base and frame structure of the ornament.

An illustrative embodiment of the invention is shown in the accompanying drawing in which:

Fig. 1 is a fragmentary, side elevational view of a vehicle having a hood provided with an ornament embodying the invention and illustrating, in dotted lines, the manner in which the engine compartment is illuminated by the ornament light when the hood is in open position.

Fig. 2 is a side elevational view, partly in section, of the ornament shown within the circle A of Fig. 1.

Fig. 3 is a transverse sectional view taken on the line 3—3 of Fig. 2.

Fig. 4 is a transverse sectional view taken on the line 4—4 of Fig. 2.

In the form of the invention illustrated in the drawing, the improved ornament, generally designated by the numeral 10, is illustrated in connection with a vehicle hood 11 of the alligator type although it may be used in conjunction with vehicle hoods of the butterfly type (not shown) in which the ornament is conventionally mounted upon a central rib structure on which the respective sections of such hoods are hinged.

The ornament comprises an integral metal base structure 12, a frame structure 13, a forwardly rounded nose portion 14 and a tapered rear extremity 15. The base portion 12 has a lower side surface 16 which conforms in curvature with the portion of the sheet metal hood 11 upon which it is adapted to be mounted. The body portion of the ornament comprises spaced side walls 17 and 18 in which are formed registering openings 19. A passage 20 is provided in the base portion 12 of the ornament in order to accommodate insertion between the spaced walls 17 and 18 of a plastic light-transmitting element, generally designated by the numeral 21.

As illustrated in Fig. 3 the light transmitting element 21 comprises complementary sections 22 and 23 which are so assembled as to produce a hollow space or cavity in the interior of the element 21. The sections 22 and 23 have abutting edge portions 24 and 25 at their upper and lower extremities, respectively, which are held in contact with each other by the walls 17 and 18 of the body portion of the ornament and by side walls 25' of a groove formed in the frame structure 13 of the ornament. The sections 22 and 23 preferably comprise light transmitting plastic material having the capacity to transmit light edgewise therethrough such as "Lucite." Protruding from the interior sides of the sections 22 and 23 are ridge-like projections 26 from which light entering the element 21 from below, as hereinafter more clearly set forth, is emitted to illuminate an outline of predetermined configuration. The sections 22 and 23 are held in assembled relation between the side walls 17 and 18 and between the side walls 25' of the groove formed in the frame structure 13 by screws 27 as shown in Fig. 4. The screws 27 each extend through an aperture formed in adjacent flanges 28 and 29 extending outwardly from the sections 22 and 23, respectively. The screws 27 are threaded in apertures formed in the metal body structure of the ornament and their heads engage lower surfaces on the flanges 28 and 29 as to urge the sections 22 and 23 upwardly in the passage provided between the side walls 17 and 18.

The light transmitting element 21 may be assembled in the integral base and frame structures 12 and 13 by inserting it through the passage 20 formed in the base before the ornament is mounted on the vehicle hood 11. The ornament and a bracket 30 are simultaneously mounted on the external and internal sides respectively of the hood 11 by screws 31 which extend through apertures formed in the end portions of the bracket 30 and which are threaded in apertures formed in the base portion 12 of the ornament. The hood 11 is provided with an opening 32 which registers with parts of the lower edge portions 24 of the ornament sections 22 and 23 and through which light rays are admitted from a light bulb 33 which is mounted on the bracket 30 and positioned on the inner side of the hood 11. Light from the bulb 33 passes through the opening 32 in the hood through the passage 20 in the base portion of the ornament and is directed upon the lower extremity of the element 21 from which it is transmitted edgewise through the side wall sections 22 and 23. The light rays illuminate the side wall portions which are visible through the openings 19 in the ornament and some of the light rays are emitted from the protruding edge portions 26 to depict a configuration which is also visible through the opening 19 in the side walls of the ornament. The bracket 30 is provided with an opening 34 through which light from the bulb 33 is emitted into the engine compartment of the vehicle while the hood is in its raised position illustrated in dotted lines in Fig. 1.

Although but one embodiment of the invention is herein shown and described, it is to be understood that various changes in the size, shape and arrangement of parts may be made without departing from the spirit of the invention.

I claim:

1. A vehicle hood ornament comprising a base portion having an upwardly extending passage therein provided with upper and lower open ends, a frame-like upper part on said base portion having a channel in its inner edge portions and providing a circumscribed central open space adjacent the open side of said channel, a hollow light transmitting configuration bearing element mounted in said passage comprising complementary sections having inwardly extending abutting flanges on its lower edge portions exposed at the lower open end of said passage and having a hollow body portion filling said central open space with its remaining edges seated in said channel, said complementary sections being held in assembled relation by engagement of said abutting flanges and said remaining edges between the side walls of said passage and channel respectively, and a light bulb arranged to direct light rays through the lower open end of said passage and the exposed flanges of said element for emitting light edgewise through the sides of said sections and transversely through said flanges.

2. A vehicle hood ornament comprising a base portion having an upwardly extending passage therein provided with upper and lower open ends, a frame-like upper part on said base portion having a channel in its inner edge portions and providing a circumscribed central open space adjacent the open side of said channel, a hollow light transmitting configuration bearing element mounted in said passage comprising complementary sections having inwardly extending abutting flanges on their lower edge portions exposed at the lower open end of said passage and having a hollow body portion filling said central open space with its remaining edges seated in said channel, said complementary sections being held in assembled relation by engagement of said abutting flanges and said remaining edges between the side walls of said passage and channel respectively and having light emitting ridge-like flanges on their inner side surfaces arranged to depict a predetermined configuration, and a light bulb arranged to direct light rays through the lower open end of said passage and upon the exposed edge portions of said element for transmission by the sides of said sections to the respective light emitting ridge-like flanges.

OLIVER H. CLARK.